June 22, 1965  R. HASSA  3,190,608
ELECTROMAGNETICALLY CONTROLLED VALVE
Filed Feb. 7, 1962
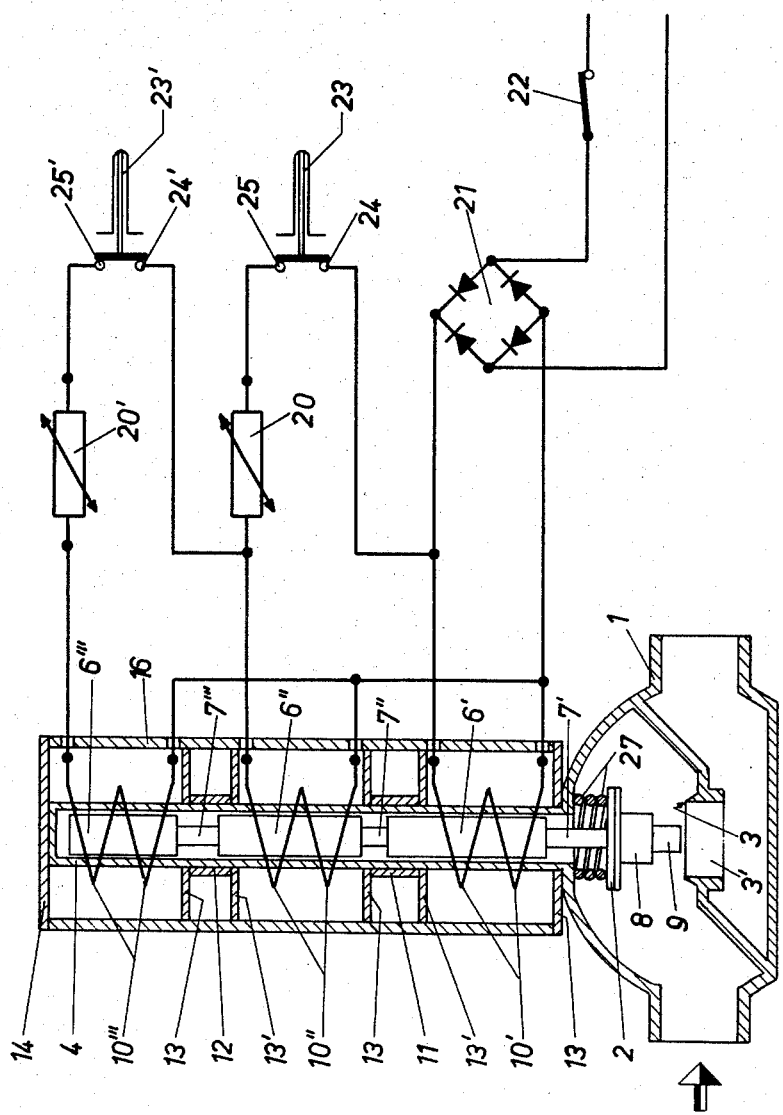
INVENTOR:
Richard Hassa
BY:
Darbo, Robertson + Vandenburgh,
Attorneys 3,190,608
ELECTROMAGNETICALLY CONTROLLED VALVE
Richard Hassa, Osnabruck, Germany, assignor to G.
Kromschroder Aktiengesellschaft, Osnabruck, Germany
Filed Feb. 7, 1962, Ser. No. 172,380
12 Claims. (Cl. 251—121)

This invention relates to electromagnetically controlled valves. More particularly the invention relates to electromagnetically controlled valves having a valve stem which carries a plurality of spaced solenoid armatures associated with a corresponding number of mutually independent solenoids, and in which the innermost solenoid is capable of energization independently of the remaining solenoids.

When it is desired to effect a series of "switching stages," to enable adjustment of the valve to be carried out, with one of the known multi-stage valves, i.e. if its thermostat controlled valve is to be regulated in addition to being controlled, its valve has to be constructed as a plate valve, and moreover means have to be provided for carrying into effect the various switching positions of the known valve. As suitable means, for example an electrically driven switching motor, could be contemplated. Moreover the multiple structural elements constituting the switching device would have to be maintained, since otherwise reactions against the forces emanating from the magnetic field to be added, may even override the same. The valve according to the invention is of substantially simpler construction, since it may dispense with the switching motor and switching device, and consequently is reliable in operation.

In another known multi-stage valve, which is likewise provided with solenoid armatures, the same are not rigidly connected with one another as according to the present invention but are connected chain-fashion by means of coupling pieces. According to the invention, these coupling pieces and the provision of annular grooves in the armatures slidably engaged by these coupling pieces, as well as the provision of a spring between any two adjacent armatures may be dispensed with. Moreover with this known multi-stage valve the coils have to match the actual length of lifting stroke of the valve also by their axial length. In contrast, the coils of the valve according to the invention may be of equal length, a fact, which is desirable as regards exchangeability and store keeping.

In another multi-stage control device with solenoid armatures the individual switching positions are attained by the actuating of a switching device which is composed of a control slide, a reversing switch and a change-over switch. By actuating the switching device the magnet coils are mutually operated. This particular switching device can be dispensed with according to the present invention. In the first place, it is not possible to perform with the known control device the thermostatic control disclosed by the present invention. For this purpose additional means for actuating the change-over switch would have to be provided.

Moreover a two-stage valve is known, in which apart from a solenoid armature also an armature plate has to be provided for the first switching stage, as distinguished from the present application. This armature plate abuts a component, which is connected magnetically conductive with the casing, any time the first switching stage is switched on. Thereby a noise is generated, which for a great many purposes e.g. for domestic use is not permissible, whereby the usefulness of this control device is made doubtful. Even if one would provide means for a third switching stage in this device, a third switching stage could not be realized, since reaction forces would be generated between the preceding inner coil and the associated armature portion, which would oppose the pushing of the armature out of this field of lines of force. In contrast, as many switching stages as desired may be provided according to the invention without any opposed forces arising on transition to another switching position.

Moreover valves having a single coil and a single armature are known which permit various switching positions but only a limited overall stroke when using non-laminated magnets. Such electromagnetically controlled valves are brought into the various switching positions by voltage variations; they are accordingly dependent on the grid voltage. Variations in the grid voltage accordingly unfavorably affect the valve stroke.

According to the present invention an electromagnetically controlled plate valve comprises a valve plate mounted on a valve stem which carries at least a first and a second solenoid armature spaced from one another and rigidly connected by non-magnetic means and each movable axially of a first and second, mutually independent, associated solenoid, respectively, the first solenoid being capable of energization without energizing the second solenoid and the second solenoid being capable of energization only when the first solenoid is energized, the length of the second solenoid armature being shorter than that of the first solenoid armature, by a predetermined amount related to the stroke of the valve plate, but at least as great, or almost as great, as its associated magnetic field.

The plate valve permits a large overall stroke to be obtained with a small switching current and the series of solenoids enables adjustment of the valve to be effected in a series of "switching stages," each "switching stage" corresponding to the energization of a solenoid. By virtue of the predetermined variation in length of the solenoid armatures, it is ensured that each solenoid armature short-circuits its associated magnetic field without leaving the same when further switching stages are energized or upon voltage fluctuations, and that the multi-stage valve thus formed may be controlled from one or more thermostats without requiring special means for doing so.

In the valve according to the invention unavoidable grid fluctuations cannot become effective since each armature is drawn fully into the magnetic field of its associated coil, and remains therein owing to the reserve power usually inherent to the coils.

In order to provide a possibility for determining the passage area of the valve in a simple manner for each stage, it is proposed according to the present invention that the valve plate mounted on the common armature spindle has on the side of the valve seat as many projections as there are switching stages, which projections are adapted in cross section area and in axial height to the individual switching stages, in such a manner that the projection corresponding to an intermediate switching stage yet projects into the valve aperture when the armature or armatures are being attracted.

The valve is opened rapidly in the first switching stage but gradually and slowly in any other stage, whereby a soft ignition of a gas fire is secured. This is attained, according to the invention as the circuits of any magnet coil following the inner magnet coil adjacent the valve are shunted in parallel with one another with the interposition of a negative temperature co-efficient resistor between any of them, while the circuit of the magnet coil adjacent the valve is directly connected to the grid, and also the circuits of both inner magnet coils are shunted in parallel to one another.

Negative temperature co-efficient resistors for the control of "on" and "off" electromagnetically controlled valves having a solenoid armature are already known.

In such an "on" and "off" valve a slow opening is not, however, attained, because the static gas pressure acting on the valve seat opposes a slow-opening thereof. Only when the resistance value of the negative temperature co-efficient resistors connected in the circuit of the magnet coil, owing to being heated by the current flowing through it, has dropped to such an extent that the magnet coil is almost fully energized, the valve is opened suddenly. The effect desired is accordingly not attained, or only quite imperfectly.

In contrast, the magnet coil of the first switching stage of the valve according to the invention is connected directly to voltage. The valve consequently opens at once against the gas pressure and spring bias, and performs a stroke limited by the magnetic field of the inner coil. Through the valve, now partially open, an approximate equilibrium is established between the pressure above and below the valve plate whereafter—since the valve plate is relieved of gas pressure—the further opening of the valve can take place slowly in the remaining switching stages owing to the known characteristics of the negative temperature co-efficient resistors.

In order to abolish the humming of magnets energized by alternating current which is due to the grid frequency, as a further development of the principle of the invention, provision is made for connecting a rectifier, in a manner known per se, into the input of the circuits of all the magnet coils.

The accompanying drawing shows, by way of example, an electromagnetically controlled valve having two intermediate switching positions, in vertical section, in the maximum open position, with the associated circuit diagram.

In the drawing, 1 denotes the valve casing 2 a valve plate 3 the valve seat thereof having a valve passage 3', and 4 a sleeve connected only with the interior of the valve casing 1. The sleeve 4, which has to be of non-magnetic material, encloses the solenoid armatures 6', 6'', 6''' which are connected with the valve plate and with one another by means of intermediate pieces 7', 7'', 7'''. On the side of the valve plate 2 facing the valve seat 3 two projections 8, 9 are arranged on said plate. The projection 8 is of larger cross section than the projection 9. The two projections are of equal axial height, and accordingly correspond to the lengths of stroke of the predetermined intermediate switching stages, which lengths here have been selected equal. Between the upper part of the valve casing 1 and the side of the valve plate 2 averted from the valve seat 3 a spring 27 is arranged as a biasing means. Three coils of equal height are denoted 10', 10'', 10''', respectively, which are arranged independently of one another, axially on top of each other, the sleeve 4 passing axially through them. Spacer sleeves 11, 12 of non-magnetic material are inserted between the coils 10', 10'', 10'''. Each of the coils 10', 10'', 10''' is covered radially on both ends by annular discs 13, 13', 14 of magnetic material for closing the circuit of the magnetic flux. All the coils and magnetic flux closing discs are enclosed in a tubular section 16, which likewise consists of magnetic material.

As will also be seen in the drawing, the three solenoid armatures 6', 6'', 6''' and the intermediate pieces 7'', 7''' lying between them are of different height, each outer solenoid armature following the preceding inner solenoid armature being shortened by the length of stroke, which has been selected equal here for each switching stage, while the intermediate piece 7''' exceeds the intermediate piece 7'' in length by the same length of stroke. Thereby it is attained, that each solenoid armature short-circuits its associated magnetic field generated by the coils 10', 10'', 10''', respectively, without moving out of its field when further switching stages are added, and this the less so, when—in a manner known per se—the free magnet field is additionally bounded by magnet flux closing sleeves (not shown).

The electric circuit diagram for actuating this multistage valve is composed as follows:

By the closing of a main switch 22 the "inner" magnet coil 10', lying closest to the valve seat 3, is directly connected to the direct current output of a rectifier 21. In parallel to the coil 10' a circuit is connected, which contains in series a rest contact 24, 25 of a thermostat 23, a negative temperature co-efficient resistor 20, and the coil 10'' for the second switching stage of the valve. In parallel to the coil 10'' a further circuit is connected which contains in series a rest contact 24', 25' of a further thermostat 23' a further negative temperature co-efficient resistor 20' and the coil 10''' for the third switching stage of the valve.

The manner of operation of the valve is as follows:

By the closing of the main switch 22 firstly the coil 10' is fully energized, whereby the valve is at once opened against the gas pressure and the bias of the spring 27 acting on the valve plate 2, to such an extent, that the projection 8 still protrudes into the valve passage 3'. This first partial stroke of the valve takes place immediately, and is limited by the magnetic field of the coil 10'. Above and below the valve plate then very quickly an approximate pressure equilibrium is established, and the valve plate is thereby relieved of gas pressure. Simultaneously with the closing of the main switch 22, a current begins to flow also in the circuit of the second, and later in that of the third switching stage, which however is initially weak owing to the high cold-resistance of the negative temperature co-efficient resistors 20, 20' connected in these circuits. Owing to the resistance value of the negative temperature co-efficient resistors 20, 20' gradually diminishing due to the heating thereof, the current flowing through the coils 10'', 10''' increases, whereby the corresponding armatures 6'', 6''' are then attracted slowly and gradually into the ever increasing magnetic field. The gradual lifting of the valve plate takes place owing to the quicker heating of the negative temperature co-efficient resistor 20, and subsequently owing to the further increasing heating of the negative temperature co-efficient resistor 20'. While in the first switching stage the passage area of the valve is determined by the dimensions of the projection 8 of the valve plate protruding into the valve passage, the passage area in the second switching stage is determined by the dimensions of the projection 9 of the valve plate, which then is the only one protruding into the valve passage. In the last switching stage the valve passage is no longer throttled at all.

When the maximum permissible room temperature considered is attained by the gas heated fireplace, i.e. when the heating-up period is terminated, the thermostat 23' switches the coil 10''' off, and the valve plate, loaded by the bias of the spring 27, drops so far that the projection 9 again protrudes into the valve passage. The valve plate will remain in this position, because then the magnetic field of the coil 10'' retains the armature 6''. When nevertheless the room temperature does not drop, the thermostat 23 switches the coil 10'' off. The valve passage is then further restricted by the projection 8 now protruding into the same. When the temperature drops below the lower limit, the circuit controlling the coil 10'' is again closed by the thermostat 23, and the armature 6'' is again gradually drawn into the same, i.e. lifted. The valve passage area is consequently increased again, since only the projection 9 protrudes into it.

Upon current failure the valve moves into the closed position immediately, or when using delayed action means known per se, within the predetermined period.

Further switching stages may be added, or a switching stage may be omitted from the above described embodiment. In addition, the individual lengths of stroke could be made different from one another; this would however involve an alteration of the dimensions of the solenoid armatures and of the coils as well as of the height of the projections of the valve plate.

Invention is claimed as follows:

1. An electromagnetically operated fluid valve apparatus adapted to be connected to a source of electrical power, said apparatus including: a valve body having a wall within said body dividing said body into an inlet chamber and an outlet chamber, said wall having an opening therethrough and defining an approximately planar valve seat about said opening on the inlet chamber side, an inlet connection to the inlet chamber, and an outlet connection to the outlet chamber; a closure fitted against said seat to seal said opening, said closure having a plug extending into said opening and spaced from the sides of the opening whereby when said closure is unseated the fluid flow through the opening may be varied by varying the position of the plug with respect to the plane of the seat; means to urge the closure against the seat; and solenoid actuated operating means connected to the closure and comprising a first electromagnetic device to first unseat the closure along a line approximately normal to the plane of the seat a distance sufficient to substantially balance the fluid pressures at opposite sides of the closure and a second electromagnetic device operable only after said first device has been actuated to thereafter move the closure further away from the seat and to displace the plug further from its position.

2. An apparatus as set forth in claim 1, wherein said operating means includes: a first armature member and a first electromagnet member, one of said members being movably mounted and connected to the closure, the other member being affixed to the body, said electromagnet member including wiring means to connect the electromagnet member to said source of power, said electromagnet member being positioned with respect to the first armature member that when energized the movable member will be moved to a displaced position at which position the closure is unseated and the plug will remain in the opening; and a second armature member and a second electromagnet member, one of said second members being movably mounted and connected to the closure, the other of the second members being affixed to the body, said second electromagnet member including a second wiring means connected to the first wiring means to energize the second electromagnet member only when the first electromagnet member is energized and to increase the energization of the second electromagnet member after it is energized, said second electromagnet member being positioned with respect to the second armature member that when the second electromagnet member is energized said one of the second members will move the closure from said displaced position to a location further removed from said seat.

3. An apparatus as set forth in claim 2, wherein the electromagnet members are solenoids having a central opening to receive the armature member and the length of the first armature member as measured along its line of movement is greater than the length of the second armature member as similarly measured.

4. An electromagnetically operated fluid valve apparatus adapted to be connected to a source of electrical power, said apparatus including: a valve body having a wall within said body dividing said body into an inlet chamber and an outlet chamber, said wall having an opening therethrough and defining a valve seat about said opening on the inlet chamber side, an inlet connection to the inlet chamber, and an outlet connection to the outlet chamber; a closure including a plate fitted against said seat to seal said opening, said closure having a plug extending into said opening and spaced from the walls of the opening, said plug being larger adjacent the plate than it is further from the plate, whereby when said plate is displaced to a first distance from said seat one quantity of fluid will flow through said opening and when said plate is displaced to a second, greater, distance from said seat a greater quantity of fluid will flow through said opening; means to urge the closure against the seat; three pairs of solenoids and armatures, said armatures being connected together and connected to the closure, said armatures being mounted for movement along a given path, each of said solenoids when energized producing magnetic fields along given parts of said path, one of said armatures being of a given length along said path, a second of the armatures being less than said given length by an amount that is a function of said first distance from said seat, the third of the armatures being less than the length of the second armature by an amount that is a function of the difference between said first distance and said second distance, the length of said third armature being at least approximately as great as the part of said path along which a magnetic field is produced by the respective solenoid of the pair; and switching means connected to the solenoids to connect the same to said source of power to energize the solenoids.

5. An apparatus as set forth in claim 4, wherein said switching means additionally will energize the solenoid of the pair including the first armature at any time that the remaining solenoids are energized.

6. An apparatus as set forth in claim 5, wherein the switching means connected to the remaining solenoids will initially provide relatively little power to the solenoids when they are first energized and thereafter will provide relatively more power to the solenoids.

7. An apparatus as set forth in claim 6, wherein the switching means includes negative temperature coefficient resistors in series with the remaining solenoids to increase the power thereto after initial energization.

8. An apparatus as set forth in claim 7, wherein the switching includes a rectifier.

9. An apparatus as set forth in claim 4, wherein said opening is cylindrical and said plug comprises a first cylindrical member adjacent the plate and smaller than said opening, and a second cylindrical member on the opposite side of the first member from the plate and smaller than the first member.

10. An electromagnetically operated fluid valve apparatus adapted to be connected to a source of electrical power, said apparatus including: a valve having a plate type valve closure connected to a valve stem and movable with respect to a valve seat from a valve closed position toward a valve opened position; at least a first and a second armature member and an independent solenoid member for each armature member, said solenoid members, when energized, being adapted to produce magnetic fields of approximately predetermined lengths, said armature members being spaced from each other, displaced from the centers of the respective solenoids, and movable in a direction such that they become increasingly centered in the respective magnetic fields, the length of the second armature member being shorter than the length of the first armature member; a non-magnetic connecting member rigidly connecting said armature members; a member rigidly connecting one armature to said closure in a manner to displace said closure from said seat when said armatures are moved in said direction; and electrical control means adapted to be connected to said source of power and connected to said solenoid members to selectively energize the first solenoid member independently of the second solenoid member and to energize the second solenoid member only when the first solenoid member is energized; said members being so arranged that the second armature member is within the magnetic field of the second solenoid member and is displaced from a centered position in said field when the first solenoid member is energized.

11. A valve apparatus as set forth in claim 10, wherein said valve has an outlet and an inlet chamber with an opening therebetween with said seat being about said opening in the inlet chamber, and said closure is in said inlet chamber and includes a plug extending into said opening.

12. An electromagnetically operated fluid valve apparatus adapted to be connected to a source of electrical power, said apparatus including: a valve including a valve body and having a plate type valve closure connected to a valve stem and movable with respect to a valve seat from a valve closed position toward a valve opened position; a first solenoid member and a first armature member associated therewith, a second solenoid member and a second armature member associated therewith, a third solenoid member and a third armature member associated therewth, said solenoid members being rigidly secured to said valve body and, when energized, being adapted to produce magnetic fields of approximately predetermined lengths, said armature members being movable with respect to said body in a direction such that they become increasingly centered in the respective magnetic fields, the second armature member being shorter in length than the first armature member, the third armature member being shorter in length than the second armature member; non-magnetic members rigidly connecting the armature members; a member rigidly connecting one armature to said closure in a manner to displace said closure from said seat when said armatures are moved in said direction; and electrical control means adapted to be connected to said source of power and connected to said solenoid members to selectively energize the first solenoid member independently of the second solenoid member and to energize the second and third solenoid members only when the first solenoid member is energized; said members being so arranged that the second armature member is within the magnetic field of the second solenoid member and is displaced from a centered position in said field when the first solenoid member is energized and that the third armature member is within the magnetic field of the third solenoid member and is in a position displaced from a centered position in said field when said second solenoid member is energized.

References Cited by the Examiner

UNITED STATES PATENTS

| 1,316,187 | 9/19 | Rogers | 251—137 X |
| 1,758,540 | 5/30 | Shaw | 317—189 X |
| 2,923,521 | 2/60 | Ray | 251—129 |
| 2,968,466 | 1/61 | McGoldrick | 251—129 |
| 2,989,666 | 6/61 | Brenner | 117—123 |

FOREIGN PATENTS

| 6,753 | 6/85 | Great Britain. |
| 59,987 | 10/38 | Norway. |

M. CARY NELSON, *Primary Examiner.*